(12) United States Patent
Yang et al.

(10) Patent No.: US 8,242,520 B2
(45) Date of Patent: Aug. 14, 2012

(54) PIXEL STRUCTURE

(75) Inventors: Syuan-Ling Yang, Kaohsiung County (TW); Ching-Huan Lin, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/100,309

(22) Filed: May 4, 2011

(65) Prior Publication Data

US 2012/0161171 A1 Jun. 28, 2012

(30) Foreign Application Priority Data

Dec. 27, 2010 (TW) .............................. 99146147 A

(51) Int. Cl.
*H01L 33/00* (2010.01)
(52) U.S. Cl. ..................... 257/89; 257/98; 257/E27.131; 349/109
(58) Field of Classification Search .................... 257/88, 257/89, 98, E27.131; 349/109, 143
See application file for complete search history.

(56) References Cited

U.S. PATENT DOCUMENTS

| | | | |
|---|---|---|---|
| 5,461,503 A * | 10/1995 | Deffontaines et al. | 349/109 |
| 6,326,981 B1 | 12/2001 | Mori et al. | |
| 6,989,876 B2 | 1/2006 | Song et al. | |
| 7,364,673 B2 | 4/2008 | Arsenault et al. | |
| 7,492,379 B2 * | 2/2009 | Credelle et al. | 345/695 |
| 7,589,461 B2 * | 9/2009 | Park et al. | 313/503 |
| 7,616,376 B2 | 11/2009 | Arsenault et al. | |
| 8,174,008 B1 * | 5/2012 | Chiang et al. | 257/40 |
| 2010/0060156 A1 * | 3/2010 | Fukuda et al. | 313/504 |
| 2010/0150511 A1 | 6/2010 | Arsenault et al. | |

FOREIGN PATENT DOCUMENTS

TW I264593 10/2006

* cited by examiner

*Primary Examiner* — Tuan N. Quach
(74) *Attorney, Agent, or Firm* — Jianq Chyun IP Office

(57) ABSTRACT

A pixel structure including a pair of first sub-pixels, a pair of second sub-pixels and an electrical tunable photonic crystal layer is provided. The pair of first sub-pixels are substantially identical in area, and the pair of second sub-pixels are substantially identical in area. The area of each second sub-pixel is twice the area of each first sub-pixel. In addition, the electrical tunable photonic crystal layer is disposed over the pair of first sub-pixels and the pair of second sub-pixels.

8 Claims, 24 Drawing Sheets

Gray level 0

Gray level 1

Gray level 2

Gray level 3

Gray level 2

Gray level 3

Gray level 4

Gray level 8

Gray level 9

Gray level 11

PIXEL STRUCTURE

CROSS-REFERENCE TO RELATED APPLICATION

This application claims the priority benefit of Taiwan application serial no. 99146147, filed Dec. 27, 2010. The entirety of the above-mentioned patent application is hereby incorporated by reference herein and made a part of this specification.

BACKGROUND

1. Field

The invention relates generally to a pixel structure, and more particularly to a pixel structure having an electrically tunable photonic crystal layer.

2. Description of Related Art

Current photonic crystal displays employ electrically tunable photonic crystal layers with regular lattice structures. Therefore, due to Bragg reflection, when an external light source is incident, a light having a specific wavelength is reflected. The photonic crystal display may be driven by an applied electric or magnetic field which alters a lattice distance in the photonic crystal layer, so that light of different wavelengths are reflected and an adjustable color display is achieved. By applying suitable electric or magnetic fields, the photonic crystal layer can display light of different wavelengths (e.g., infrared light, visible light of various colors, and ultraviolet light). The photonic crystal layer is a favorable medium for display because it can directly display light of different wavelengths, without the need for a mechanism of mixing red, green, and blue light. Moreover, the colors displayed by the photonic crystal layer has high color saturation, and the photonic crystal layer has a high reflectivity.

However, with electric or magnetic field control, the photonic crystal layer can neither display white nor grayscale directly. Therefore, a pertinent issue for manufacturers to resolve is how the photonic crystal layer displays grayscale and various levels of white.

SUMMARY

Accordingly, a pixel structure having an electrically tunable photonic crystal layer capable of displaying different levels of white.

The invention provides a pixel structure, including a pair of first sub-pixels substantially identical in area, a pair of second sub-pixels substantially identical in area, and an electrically tunable photonic crystal layer. The area of each of the second sub-pixels is twice the area of each of the first sub-pixels, and the electrically tunable photonic crystal layer is disposed over the pair of first sub-pixels and the pair of second sub-pixels.

According to an embodiment of the invention, one of the first sub-pixels displays a first color light, and another one of the first sub-pixels displays a second color light. Moreover, one of the second sub-pixels displays the first color light, another one of the second sub-pixels displays the second color light, and the first color light and the second color light are complementary colors.

According to an embodiment of the invention, the pair of first sub-pixels and the pair of second sub-pixels are arranged in a 2×2 sub-pixel array.

According to an embodiment of the invention, the pair of first sub-pixels is arranged in a same column, the pair of second sub-pixels is arranged in a same column, and the pair of first sub-pixels and the pair of second sub-pixels are arranged in different columns.

According to an embodiment of the invention, the pair of first sub-pixels is arranged in a same row, the pair of second sub-pixels is arranged in a same row, and the pair of first sub-pixels and the pair of second sub-pixels are arranged in different rows.

According to an embodiment of the invention, the pair of first sub-pixels is not aligned in a column direction and in a row direction, and the pair of second sub-pixels is not aligned in the column direction and in the row direction.

According to an embodiment of the invention, the pixel structure further includes a pair of third sub-pixels substantially identical in area, and a pair of fourth sub-pixels substantially identical in area. Moreover, the area of each of the third sub-pixels is twice the area of each of the second sub-pixels, the area of each of the fourth sub-pixels is twice the area of each of the third sub-pixels, and the electrically tunable photonic crystal layer is disposed over the pair of third sub-pixels and the pair of fourth sub-pixels.

According to an embodiment of the invention, one of the first sub-pixels displays a first color light, and another one of the first sub-pixels displays a second color light. One of the second sub-pixels displays the first color light, and another one of the second sub-pixels displays the second color light. One of the third sub-pixels displays the first color light, and another one of the third sub-pixels displays the second color light. Moreover, one of the fourth sub-pixels displays the first color light, another one of the fourth sub-pixels displays the second color light, and the first color light and the second color light are complementary colors.

By applying driving electric or magnetic fields in embodiments of the invention so the electrically tunable photonic crystal layer displays different colors, and achieving gray level display through a plurality of pairs of sub-pixels having different areas in the pixel structure, the pixel structure having the electrically tunable photonic crystal layer is capable of displaying different levels of white.

To make the above and other objectives, features, and advantages of the invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
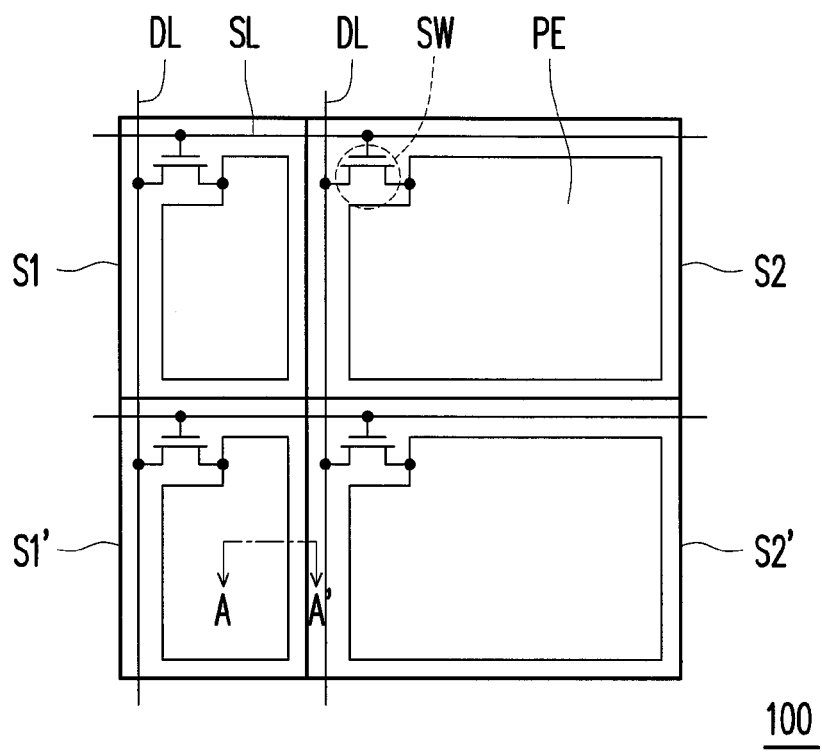
FIG. 1 is a schematic view of a pixel structure according to a first embodiment of the invention.
Figure 2:
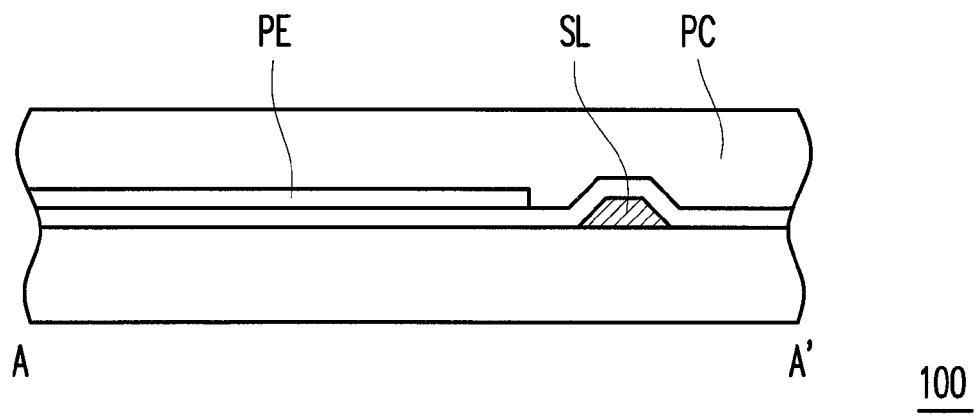
FIG. 2 is a schematic cross-sectional view taken along a cross-section A-A' depicted in FIG. 1.

FIG. 1 is a schematic view of a pixel structure according to a first embodiment of the invention. FIG. 2 is a schematic cross-sectional view taken along a cross-section A-A' depicted in FIG. 1. Referring to FIGS. 1 and 2, a pixel structure 100 of the present embodiment includes a pair of first sub-pixels S1 and S1' substantially identical in area, a pair of second sub-pixels S2 and S2' substantially identical in area, and an electrically tunable photonic crystal layer PC. The area of each of the second sub-pixels S2 and S2' is twice the area of each of the first sub-pixels S1 and S1', and the electrically tunable photonic crystal layer PC is disposed over the pair of first sub-pixels S1 and S1' and the pair of second sub-pixels S2 and S2'.

In the present embodiment, each of the sub-pixels (e.g., the first sub-pixel S1, the first sub-pixel S1', the second sub-pixel S2, and the second sub-pixel S2') respectively includes a switching device SW and a pixel electrode PE, in which the switching device SW may be a transistor, for example. Moreover, the transistor has a gate electrically connected to a scan line SL, a source electrically connected to a data line DL, and a drain electrically connected to the pixel electrode PE. Based on the foregoing, in the present embodiment, the layout of each of the sub-pixels (e.g., the first sub-pixel S1, the first sub-pixel S1', the second sub-pixel S2, and the second sub-pixel S2') may be properly modified according to design requirements.

For example, the scan line SL extends along the row direction, whereas the data line extends along the column direction. Moreover, the first sub-pixels S1 and S1' and the second sub-pixels S2 and S2' are arranged in a sub-pixel array matrix (e.g. 2×2), the first sub-pixels S1 and S1' are arranged in a same column (i.e. aligned in the column direction), and the second sub-pixels S2 and S2' are arranged in a same column. Furthermore, the first sub-pixels S1 and S1' and the second sub-pixels S2 and S2' are arranged in different columns (i.e. not aligned in the column direction).

The manufacturing process disclosed in U.S. Pat. Nos. 7,616,376 and 7,364,673 may be adopted for fabricating the electrically tunable photonic crystal layer PC of the present embodiment. However, the present embodiment does not limit the fabrication and materials of the electrically tunable photonic crystal layer PC. Any photonic crystals which can change its reflectivity of light when tuned by an electric or magnetic field is within the intended scope of the present application. In addition, with variations in the materials or the microstructures of the electrically tunable photonic crystal layer PC, the driving voltage adapted for driving the electrically tunable photonic crystal layer PC changes correspondingly. Therefore, persons having ordinary skill in the art may suitably modify the driving voltage adapted for driving the electrically tunable photonic crystal layer PC, so that the electrically tunable photonic crystal layer PC is capable of displaying the desired colors (e.g., red, green, blue, yellow, black).

When the first sub-pixel S1, the first sub-pixel S1', the second sub-pixel S2, and the second sub-pixel S2' in the pixel structure 100 all display red, the pixel structure 100 can display red. When the first sub-pixel S1, the first sub-pixel S1', the second sub-pixel S2, and the second sub-pixel S2' in the pixel structure 100 all display green, the pixel structure 100 can display green. When the first sub-pixel S1, the first sub-pixel S1', the second sub-pixel S2, and the second sub-pixel S2' in the pixel structure 100 all display blue, the pixel structure 100 can display blue. Additionally, when the first sub-pixel S1 and the second sub-pixel S2 in the pixel structure 100 display yellow, and the first sub-pixel S1' and the second sub-pixel S2' display blue, the pixel structure 100 can display white.

In light of the above, the present embodiment adopts an example for description in which white light is formed by mixing blue light and yellow light. However, the present embodiment does not limit the display of the first sub-pixel S1 and the second sub-pixel S2 in the pixel structure 100 to yellow, and likewise the present embodiment does not limit the display of the first sub-pixel S1' and the second sub-pixel S2' to blue. In other words, when the first sub-pixel S1 and the second sub-pixel S2 display a first color light (not necessarily yellow), the first sub-pixel S1' and the second sub-pixel S2' display a second color light (not necessarily blue), and the first and second color lights are complementary colors, then the pixel structure 100 can successfully display white.

In order for the pixel structure 100 to display different levels of white, the present embodiment designs the area of each of the second sub-pixels S2 and S2' as twice the area of each of the first sub-pixels S1 and S1'. A description accompanied with FIGS. 3A-3D of how the pixel structure 100 displays different levels of white is set forth below.

Figure 3A:
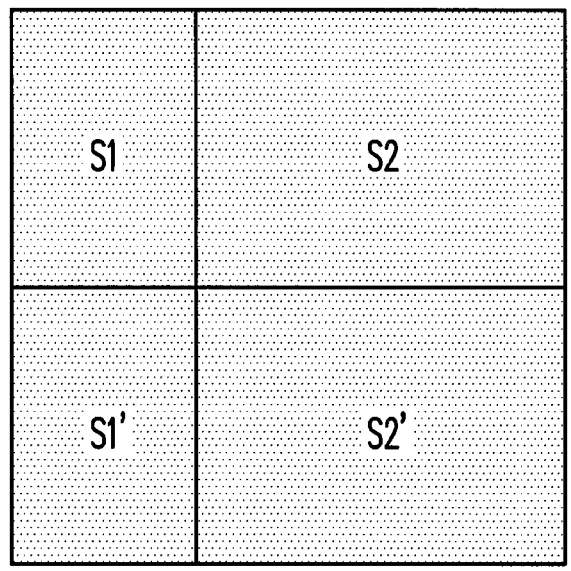
FIGS. 3A-3D are respective schematic views of the pixel structure depicted in FIG. 1 displaying gray levels 0-3.

FIGS. 3A-3D are respective schematic views of the pixel structure depicted in FIG. 1 displaying gray levels 0-3. Referring to FIGS. 3A-3D, when the first sub-pixel S1, the first sub-pixel S1', the second sub-pixel S2, and the second sub-pixel S2' are all turned off to display black, the pixel structure 100 displays gray-level 0 (as shown in FIG. 3A).

Figure 3B:
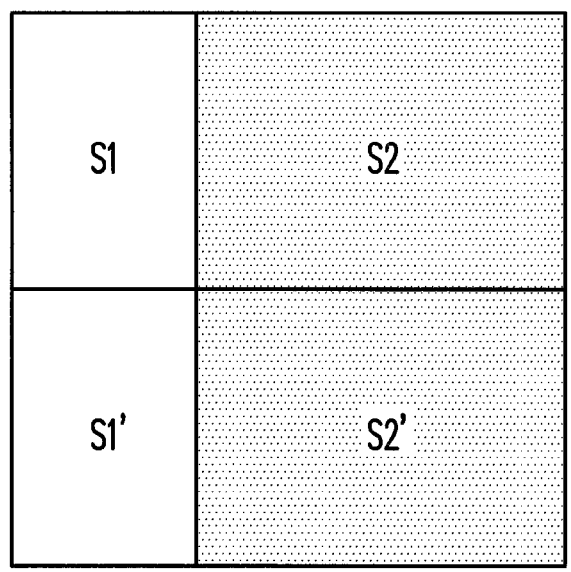

When the first sub-pixel S1 and the first sub-pixel S1' are turned on to respectively display yellow and blue, and the second sub-pixel S2 and the second sub-pixel S2' are turned off to display black, the pixel structure 100 displays gray level 1 (as shown in FIG. 3B).

Figure 3C:
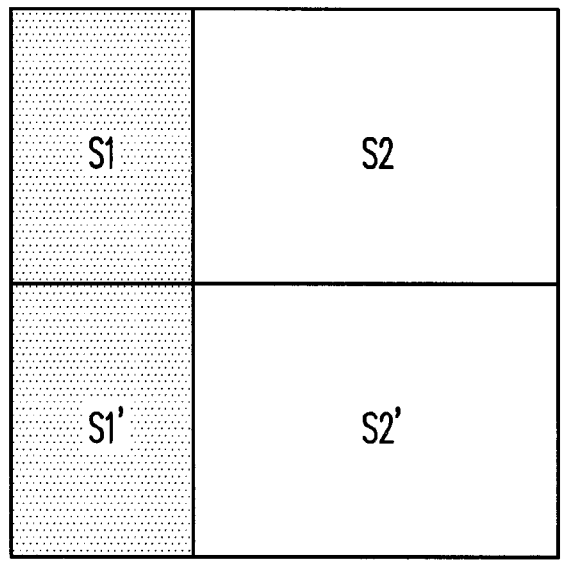

When the second sub-pixel S2 and the second sub-pixel S2' are turned on to respectively display yellow and blue, and the first sub-pixel S1 and the first sub-pixel S1' are turned off to display black, the pixel structure 100 displays gray level 2 (as shown in FIG. 3C).

Figure 3D:
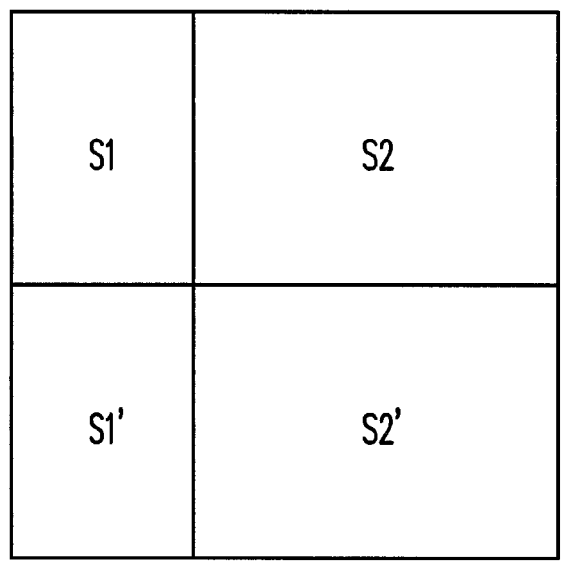

When the first sub-pixel S1 and the second sub-pixel S2 are turned on to display yellow, and the first sub-pixel S1' and the second sub-pixel S2' are turned off to display blue, the pixel structure 100 displays gray level 3 (as shown in FIG. 3D).

As shown in FIGS. 3A-3D, the pixel structure 100 formed by the first sub-pixel S1, the first sub-pixel S1', the second sub-pixel S2, and the second sub-pixel S2' may be adapted for the display of four gray levels (2 bits design).

Figure 4:
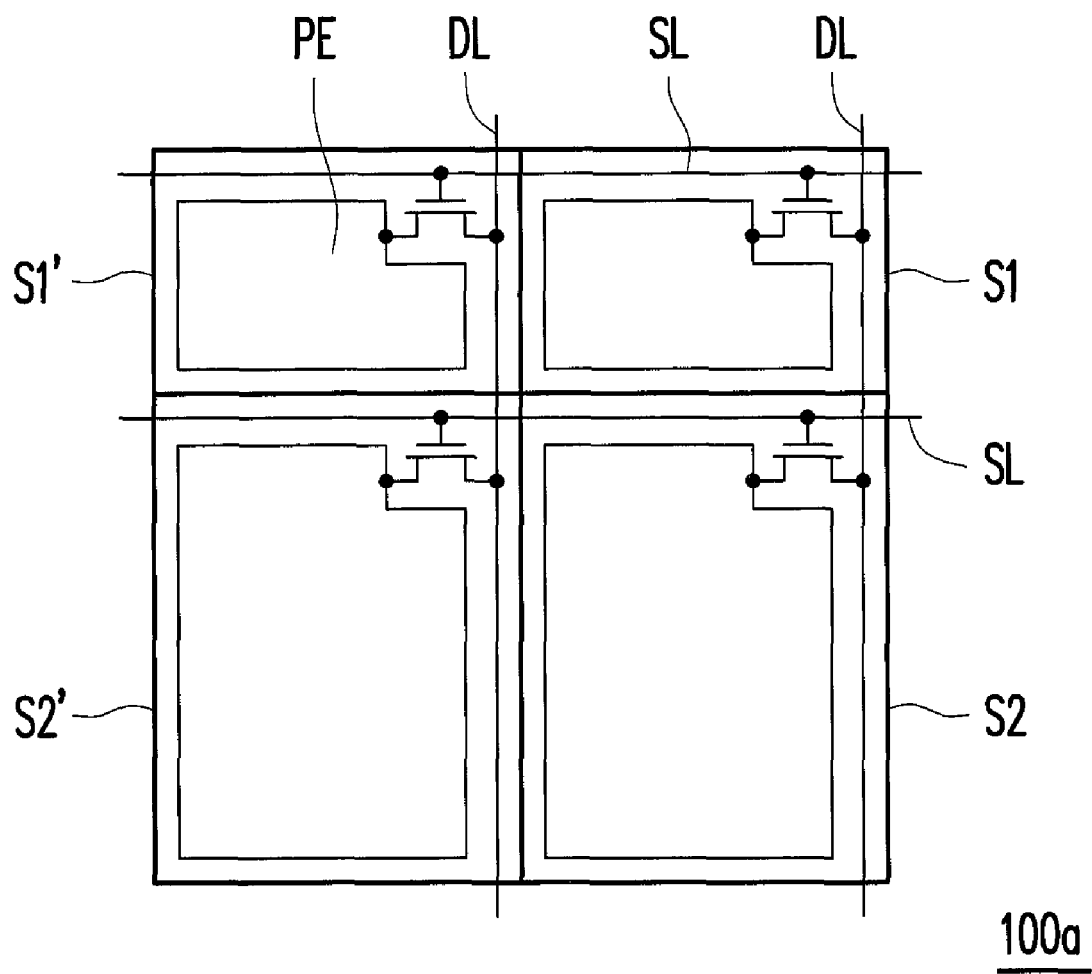
FIG. 4 is a schematic view of another pixel structure according to the first embodiment of the invention.

FIG. 4 is a schematic view of another pixel structure according to the first embodiment of the invention. Referring to FIG. 4, a pixel structure 100a depicted in FIG. 4 is similar to the pixel structure of FIG. 1. A difference therebetween is that, in the pixel structure 100a, the first sub-pixels S1 and S1' and the second sub-pixels S2 and S2' are arranged in a sub-pixel array matrix (e.g. 2×2), the first sub-pixels S1 and S1' are arranged in a same row (i.e. aligned in the row direction), and the second sub-pixels S2 and S2' are arranged in a same row. Furthermore, the first sub-pixels S1 and S1' and the second sub-pixels S2 and S2' are arranged in different rows (i.e. not aligned in the row direction). As shown in FIG. 4, the scan line SL extends along the row direction, whereas the data line extends along the column direction.

Figure 5A:
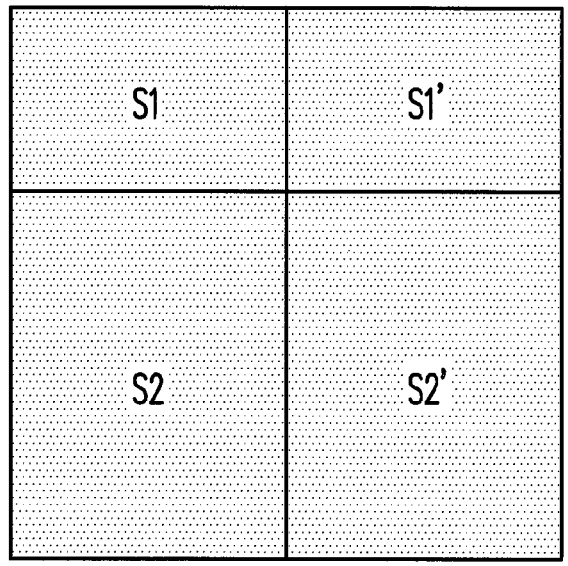
FIGS. 5A-5D are respective schematic views of the pixel structure depicted in FIG. 4 displaying gray levels 0-3.

FIGS. 5A-5D are respective schematic views of the pixel structure depicted in FIG. 4 displaying gray levels 0-3. Referring to FIGS. 5A-5D, when the first sub-pixel S1, the first sub-pixel S1', the second sub-pixel S2, and the second sub-pixel S2' are all turned off to display black, the pixel structure 100 displays gray level 0 (as shown in FIG. 5A).

Figure 5B:
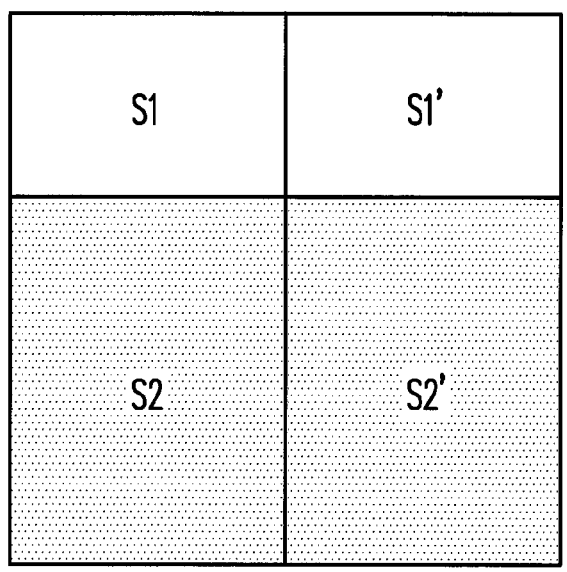

When the first sub-pixel S1 and the first sub-pixel S1' are turned on to respectively display yellow and blue, and the second sub-pixel S2 and the second sub-pixel S2' are turned off to display black, the pixel structure 100 displays gray level 1 (as shown in FIG. 5B).

Figure 5C:
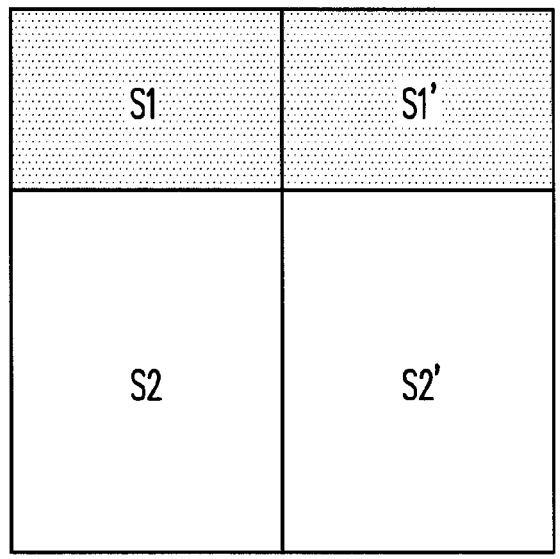

When the second sub-pixel S2 and the second sub-pixel S2' are turned on to respectively display yellow and blue, and the first sub-pixel S1 and the first sub-pixel S1' are turned off to display black, the pixel structure 100 displays gray level 2 (as shown in FIG. 5C).

Figure 5D:
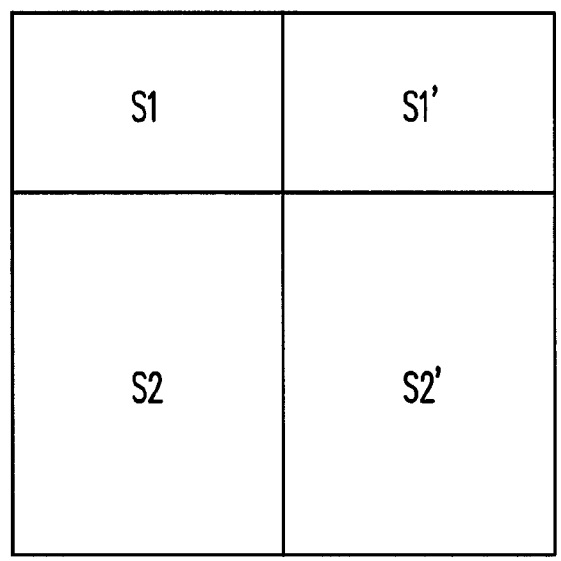

When the first sub-pixel S1 and the second sub-pixel S2 are turned on to display yellow, and the first sub-pixel S1' and the second sub-pixel S2' are turned on to display blue, the pixel structure 100 displays gray level 3 (as shown in FIG. 5D). Similarly, the pixel structure 100a formed by the first sub-pixel S1, the first sub-pixel S1', the second sub-pixel S2, and the second sub-pixel S2' may be adapted for the display of four gray levels (2 bits design).

Second Embodiment

Figure 6A:
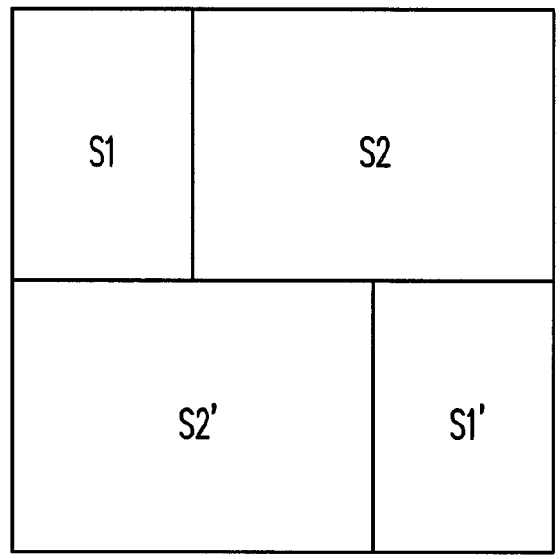
FIGS. 6A and 6B are schematic views of a pixel structure according to a second embodiment of the invention.
Figure 6B:
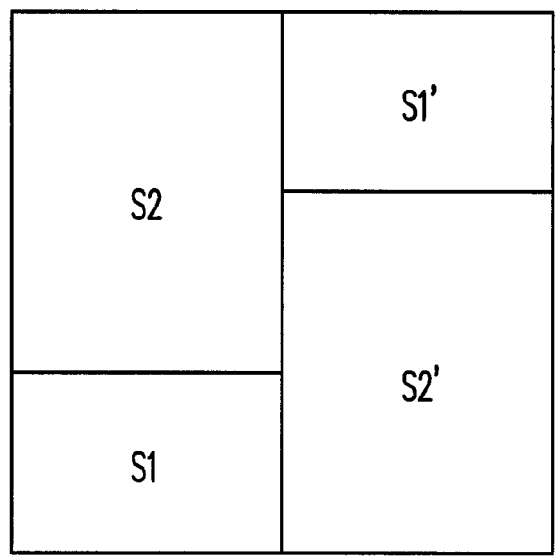

FIGS. 6A and 6B are schematic views of a pixel structure according to a second embodiment of the invention. Referring to FIG. 6A, in a pixel structure 100b according to the present embodiment, the first sub-pixels S1 and S1' are not aligned on the column and row directions, and the second sub-pixels S2 and S2' are also not aligned on the column and row directions. Moreover, the first sub-pixel S1 is aligned with the second sub-pixel S2 on the row direction, and the first sub-pixel S1' is aligned with the second sub-pixel S2' on the row direction.

Referring to FIG. 6B, in a pixel structure 100c according to the present embodiment, the first sub-pixels S1 and S1' are not aligned on the column and row directions, and the second sub-pixels S2 and S2' are also not aligned on the column and row directions. Moreover, the first sub-pixel S1 is aligned with the second sub-pixel S2 on the column direction, and the first sub-pixel S1' is aligned with the second sub-pixel S2' on the row direction.

In light of the above, the pixel structures 100b and 100c formed by the first sub-pixel S1, the first sub-pixel S1', the second sub-pixel S2, and the second sub-pixel S2' may be adapted for the display of four gray levels (2 bits design). Moreover, since the driving method of the pixel structures 100b and 100c is similar to the first embodiment, no further elaboration is included hereafter.

Third Embodiment

Figure 7:
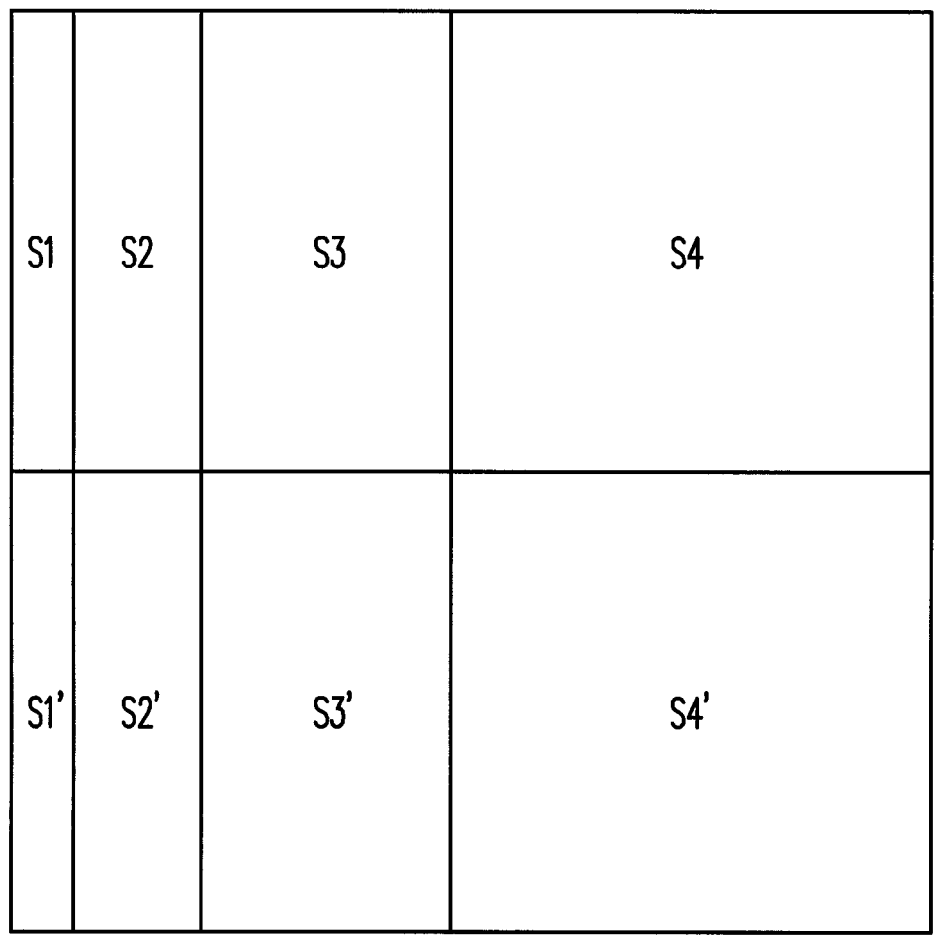
FIG. 7 is a schematic view of a pixel structure according to a third embodiment of the invention.

FIG. 7 is a schematic view of a pixel structure according to a third embodiment of the invention. Referring to FIG. 7, a pixel structure 100d according to the present embodiment includes a pair of first sub-pixels S1 and S1' substantially identical in area, a pair of second sub-pixels S2 and S2' substantially identical in area, a pair of third sub-pixels S3 and S3' substantially identical in area, a pair of fourth sub-pixels S4 and S4' substantially identical in area, and an electrically tunable photonic crystal layer PC.

The area of each of the second sub-pixels S2 and S2' is twice the area of each of the first sub-pixels S1 and S1', the area of each of the third sub-pixels S3 and S3' is twice the area of each of the second sub-pixels S2 and S2', the area of each of the fourth sub-pixels S4 and S4' is twice the area of each of the third sub-pixels S3 and S3', and the electrically tunable photonic crystal layer PC is disposed over the pair of first sub-pixels S1 and S1', the pair of second sub-pixels S2 and S2', the pair of third sub-pixels S3 and S3', and the pair of fourth sub-pixels S4 and S4'.

When the first sub-pixel S1, the first sub-pixel S1', the second sub-pixel S2, the second sub-pixel S2', the third sub-pixel S3, the third sub-pixel S3', the fourth sub-pixel S4, and the fourth sub-pixel S4' in the pixel structure 100d all display red, the pixel structure 100d can display red. When the first sub-pixel S1, the first sub-pixel S1', the second sub-pixel S2, the second sub-pixel S2', the third sub-pixel S3, the third sub-pixel S3', the fourth sub-pixel S4, and the fourth sub-pixel S4' in the pixel structure 100d all display green, the pixel structure 100d can display green. When the first sub-pixel S1, the first sub-pixel S1', the second sub-pixel S2, the second sub-pixel S2', the third sub-pixel S3, the third sub-pixel S3', the fourth sub-pixel S4, and the fourth sub-pixel S4' in the pixel structure 100d all display blue, the pixel structure 100d can display blue. When the first sub-pixel S1, the second sub-pixel S2, the third sub-pixel S3, and the fourth sub-pixel S4 in the pixel structure 100d display yellow, and the first sub-pixel S1', the second sub-pixel S2', the third sub-pixel S3, and the fourth sub-pixel S4 display blue, the pixel structure 100d can display white.

In light of the above, the present embodiment adopts an example for description in which white light is formed by mixing blue light and yellow light. However, the present embodiment does not limit the display of the first sub-pixel S1, the second sub-pixel S2, second sub-pixel S2' in the pixel structure 100d to yellow, and likewise the present embodiment does not limit the display of the first sub-pixel S1', the second sub-pixel S2', the third sub-pixel S3', and the fourth sub-pixel S4' to blue. In other words, when the first sub-pixel S1, the second sub-pixel S2, the third sub-pixel S3, and the fourth sub-pixel S4 display a first color light (not necessarily yellow), the first sub-pixel S1', the second sub-pixel S2', the third sub-pixel S3', and the fourth sub-pixel S4' display a second color light (not necessarily blue), and the first and second color lights are complementary colors, then the pixel structure 100d can successfully display white.

In order for the pixel structure 100d to display different levels of white, the present embodiment designs the area of each of the second sub-pixels S2 and S2' as twice the area of each of the first sub-pixels S1 and S1', designs the area of each of the third sub-pixels S3 and S3' as twice the area of each of the second sub-pixels S2 and S2', and designs the area of each of the fourth sub-pixels S4 and S4' as twice the area of each of the third sub-pixels S3 and S3'. A description accompanied with FIGS. 8A-8P of how the pixel structure 100d displays different levels of white is set forth below.

Figure 8A:
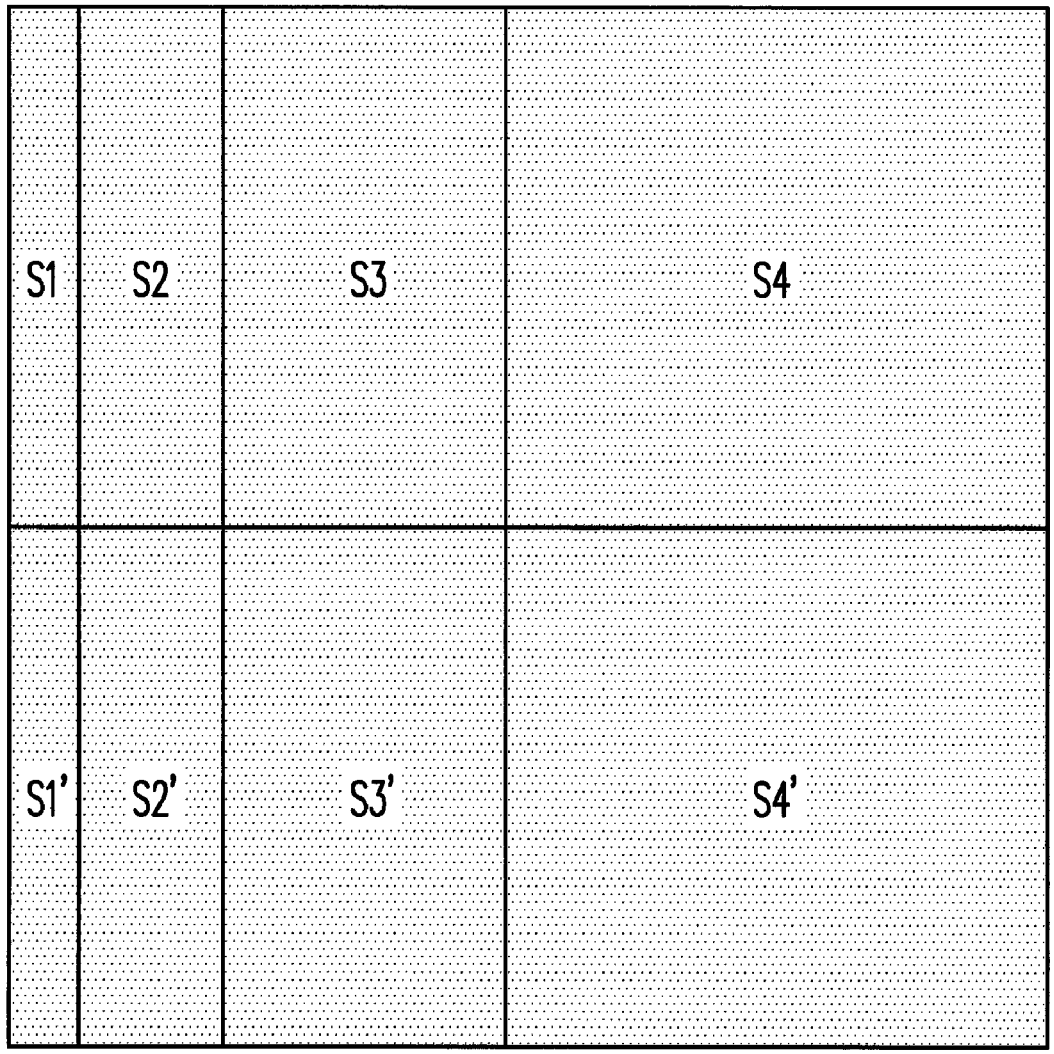
FIGS. 8A-8P are respective schematic views of the pixel structure depicted in FIG. 7 displaying gray levels 0-15.
Figure 8B:
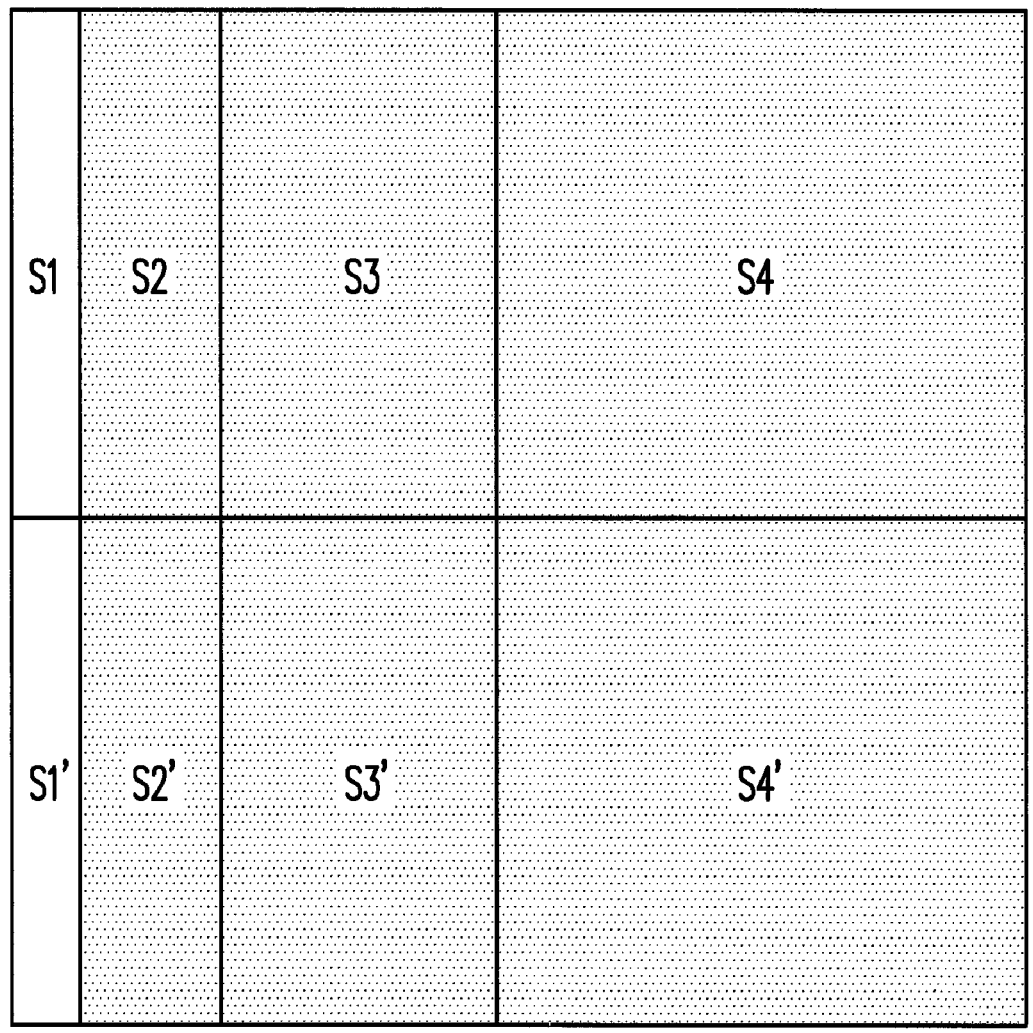
Figure 8C:
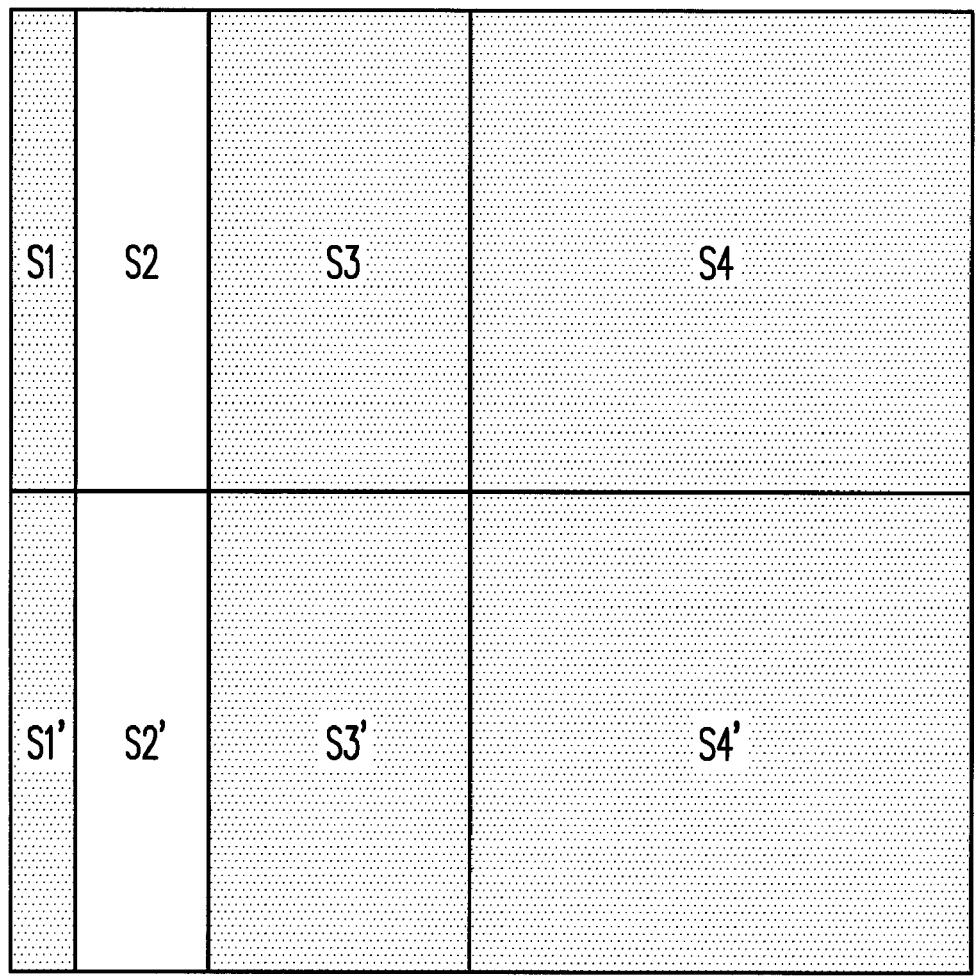
Figure 8D:
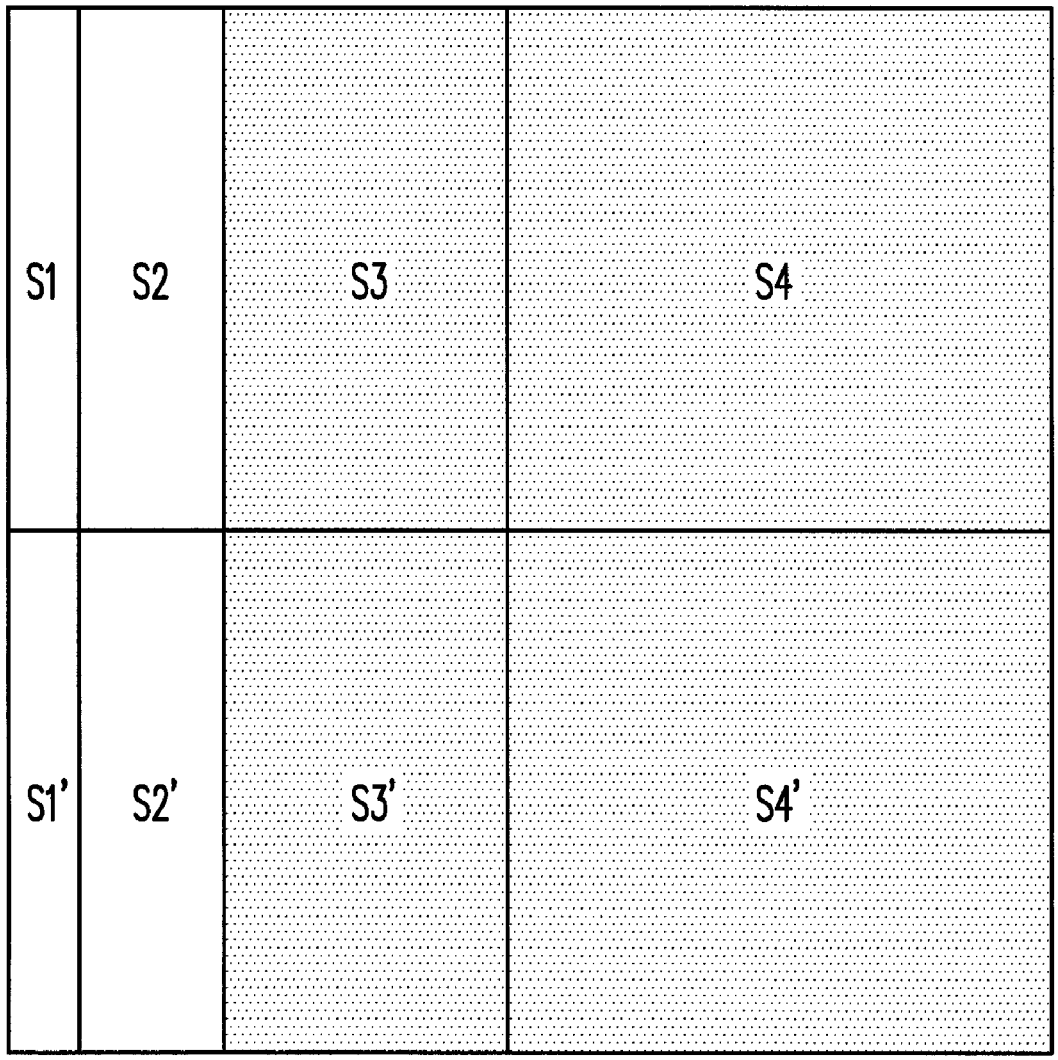
Figure 8E:
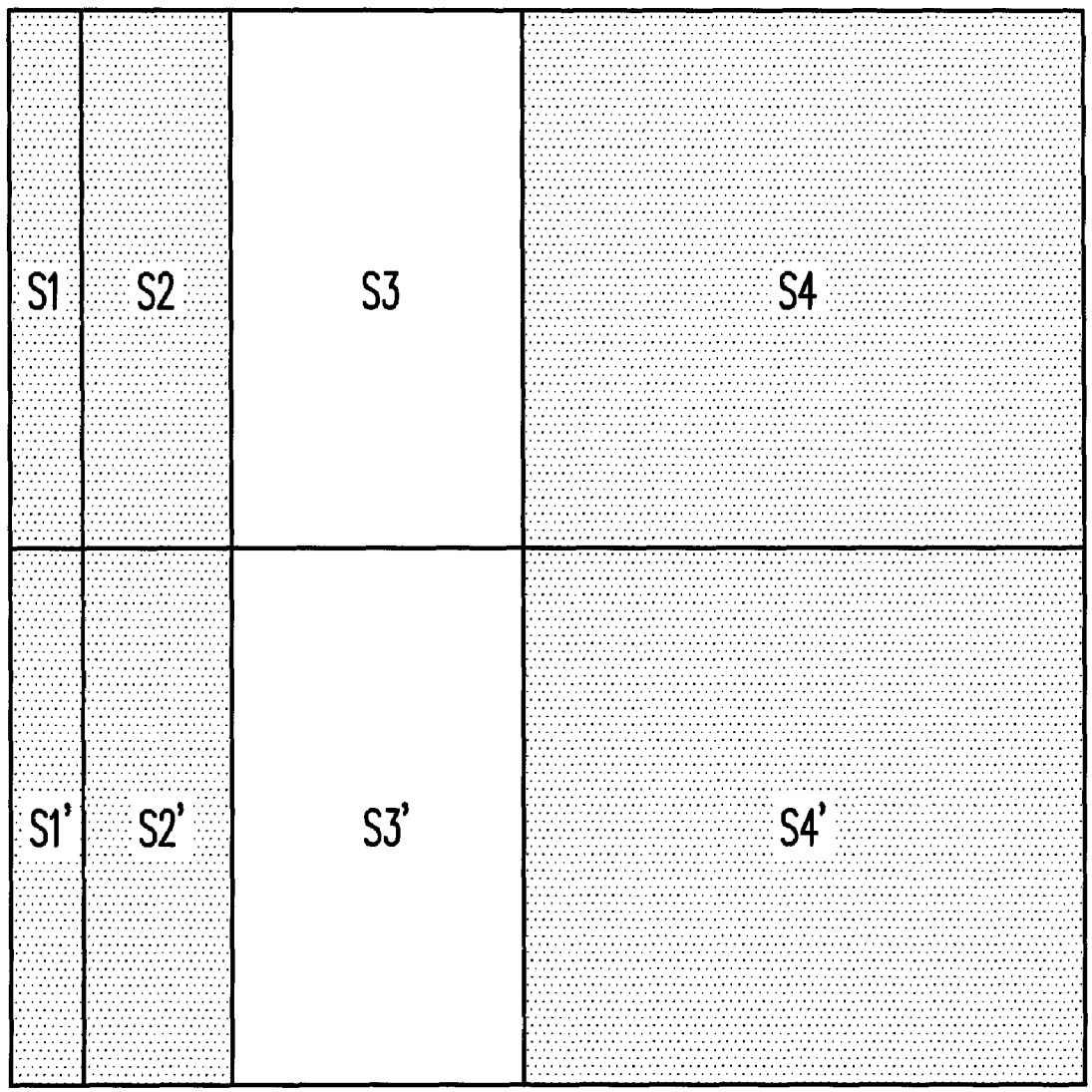
Figure 8F:
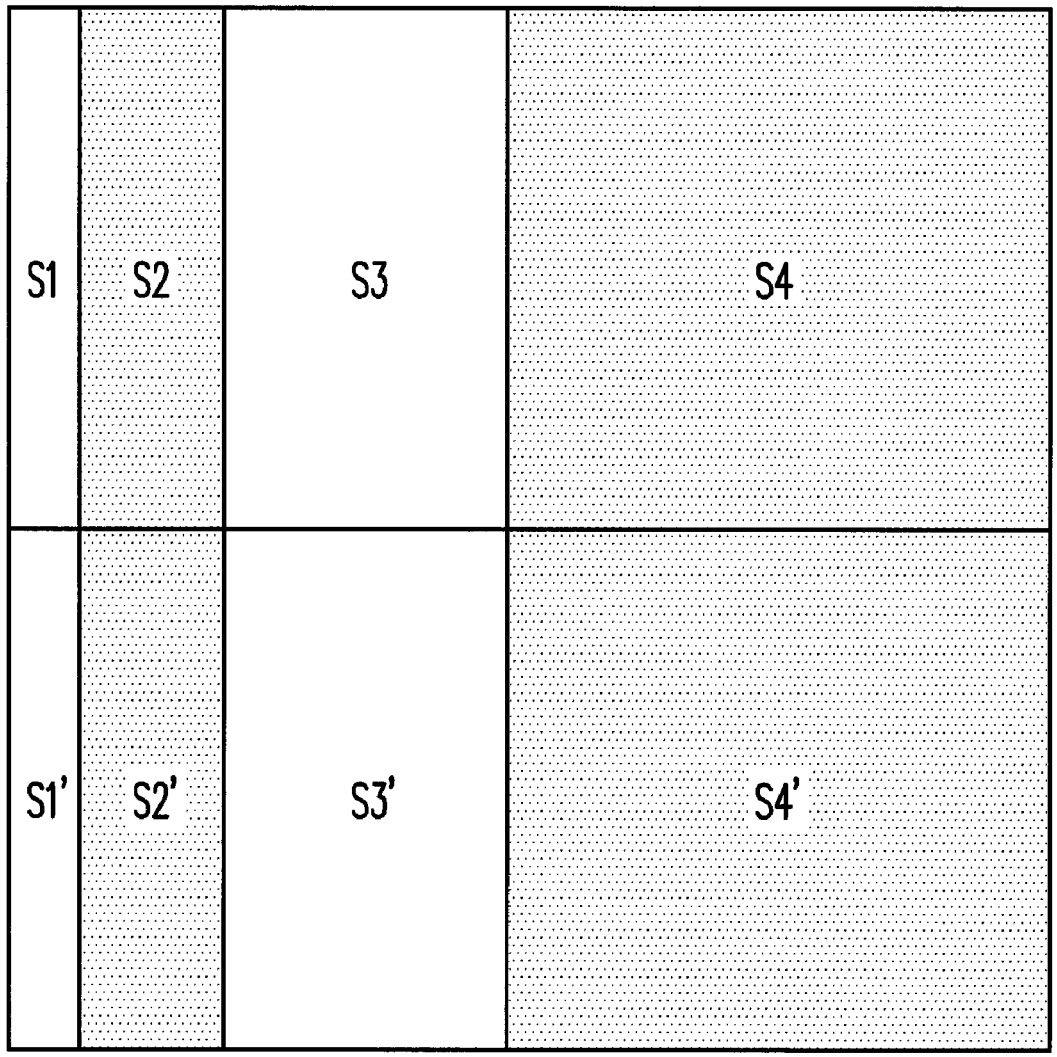
Figure 8G:
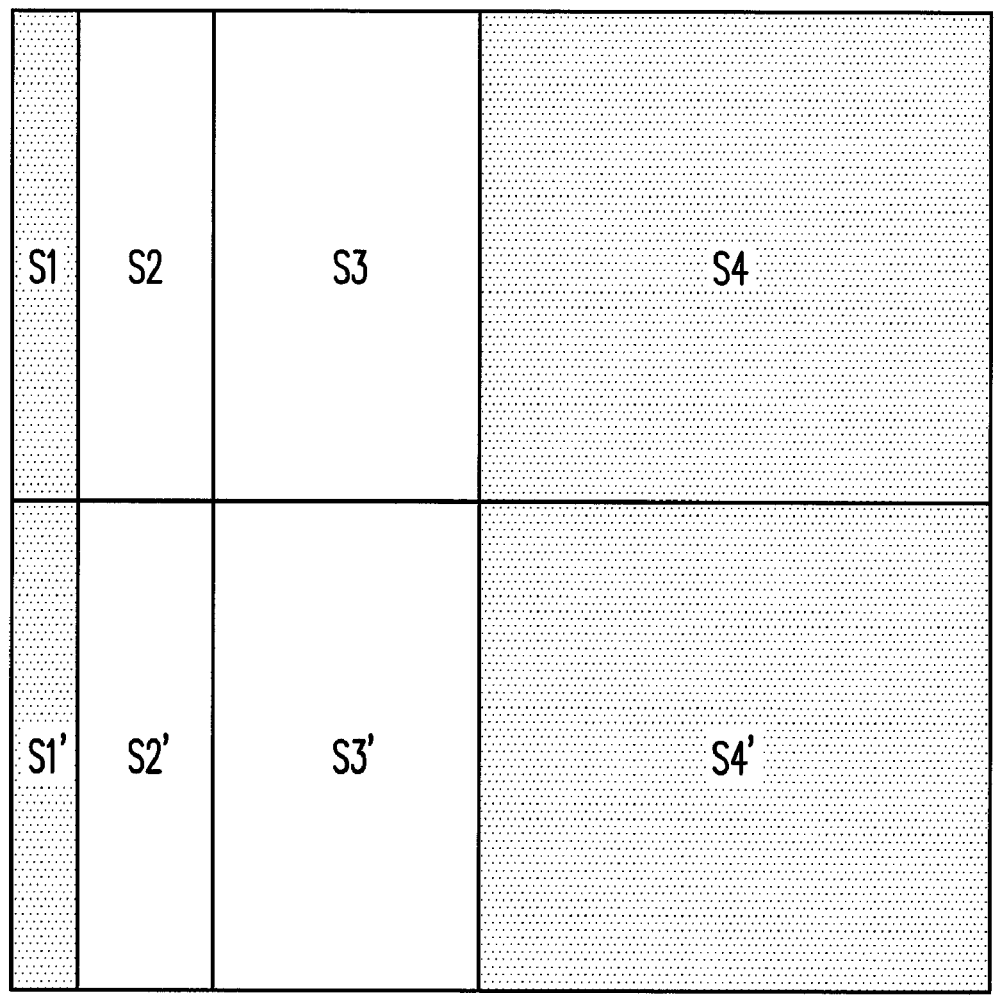
Figure 8H:
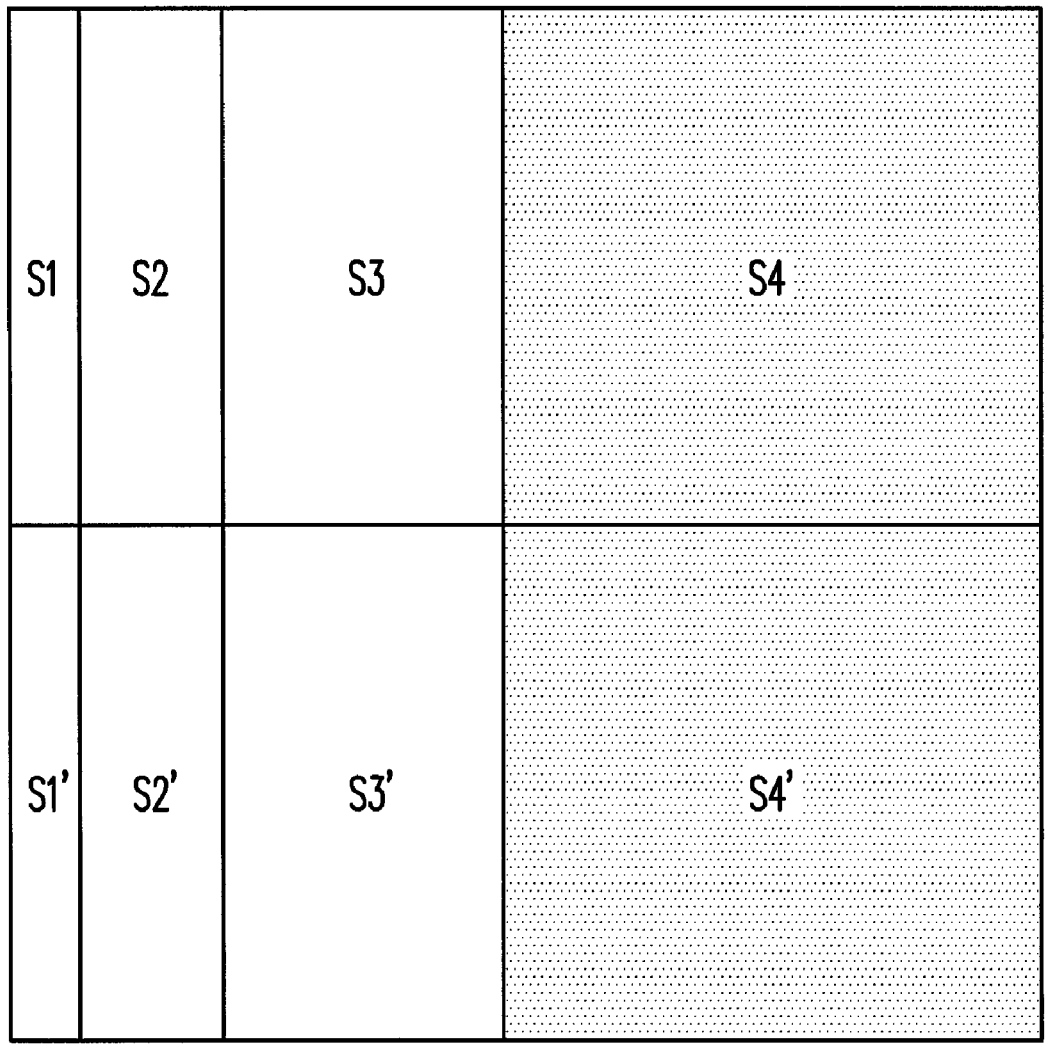
Figure 8I:
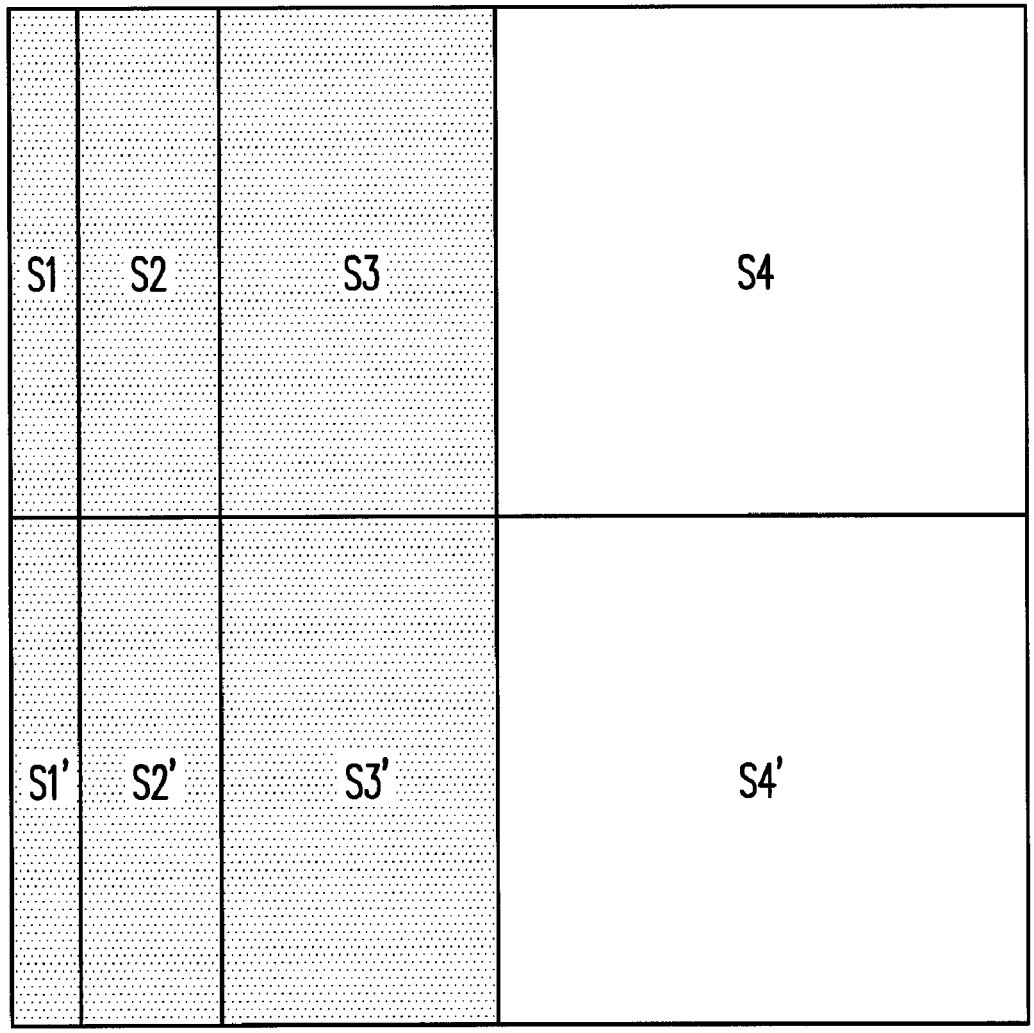
Figure 8J:
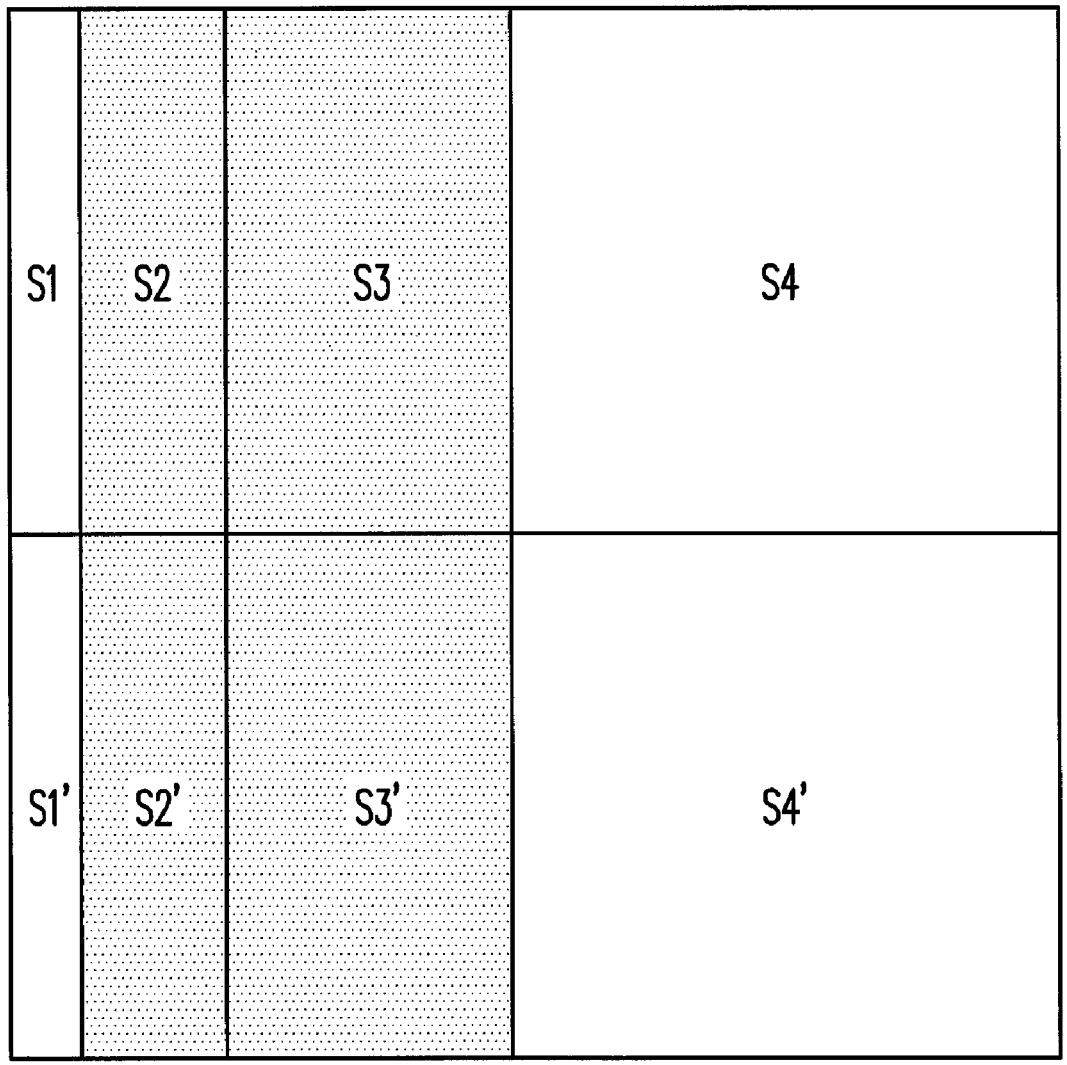
Figure 8K:
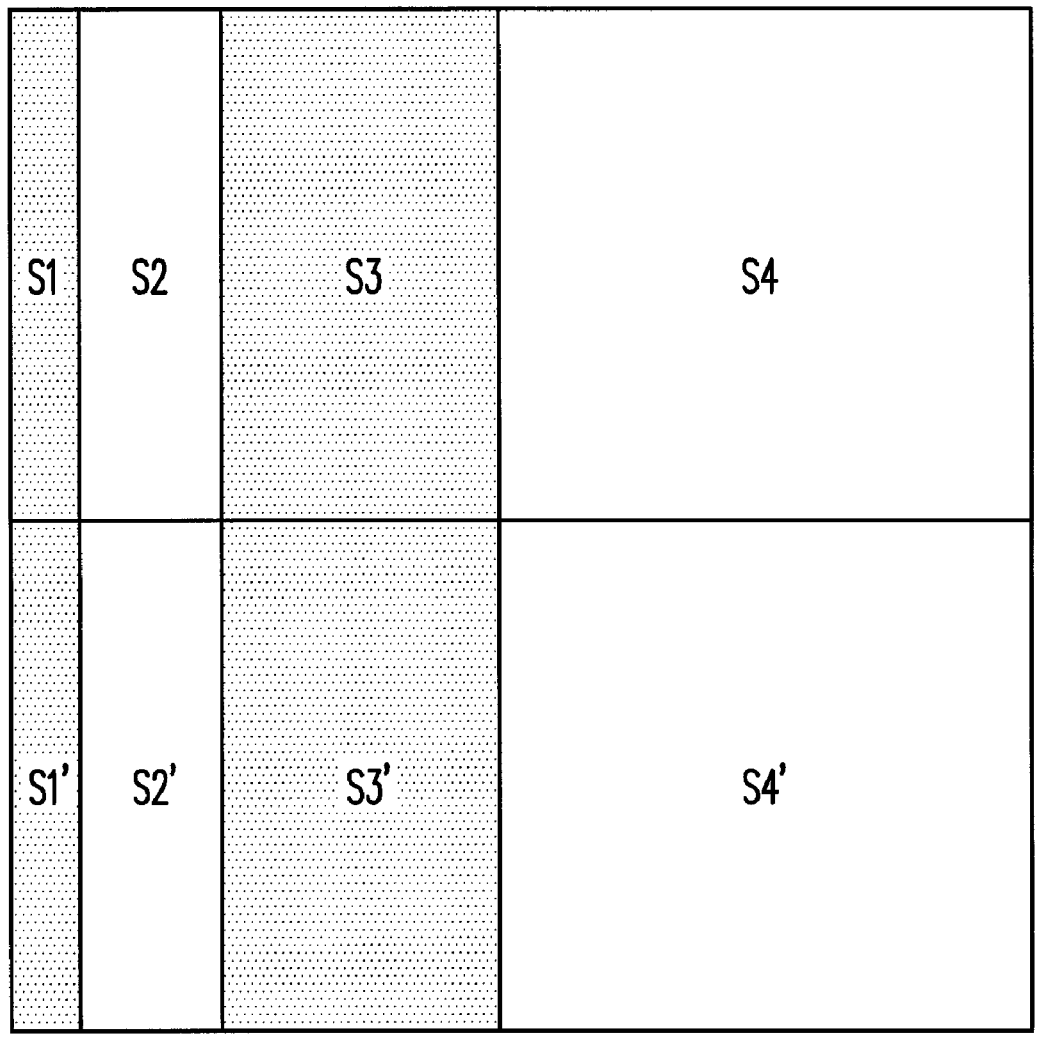
Figure 8L:
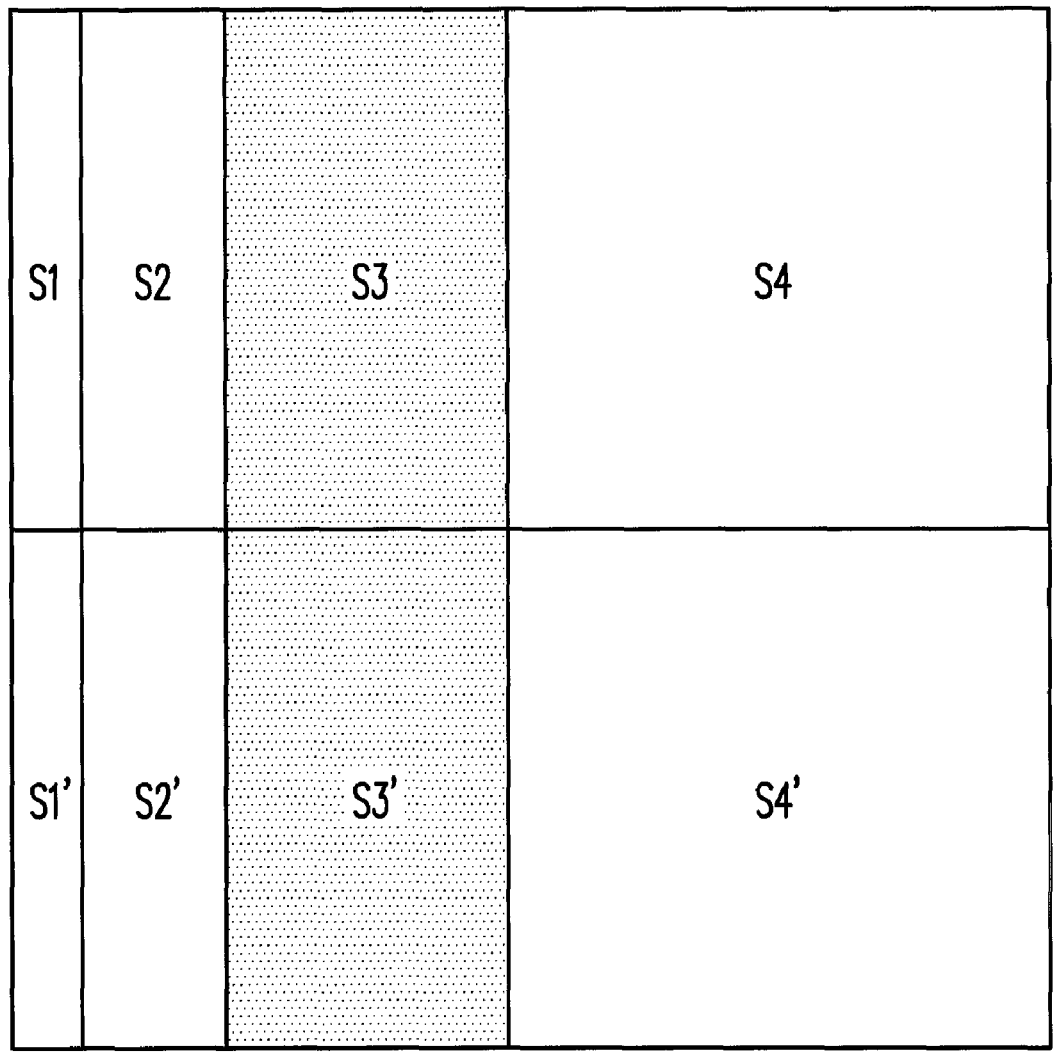
Figure 8M:
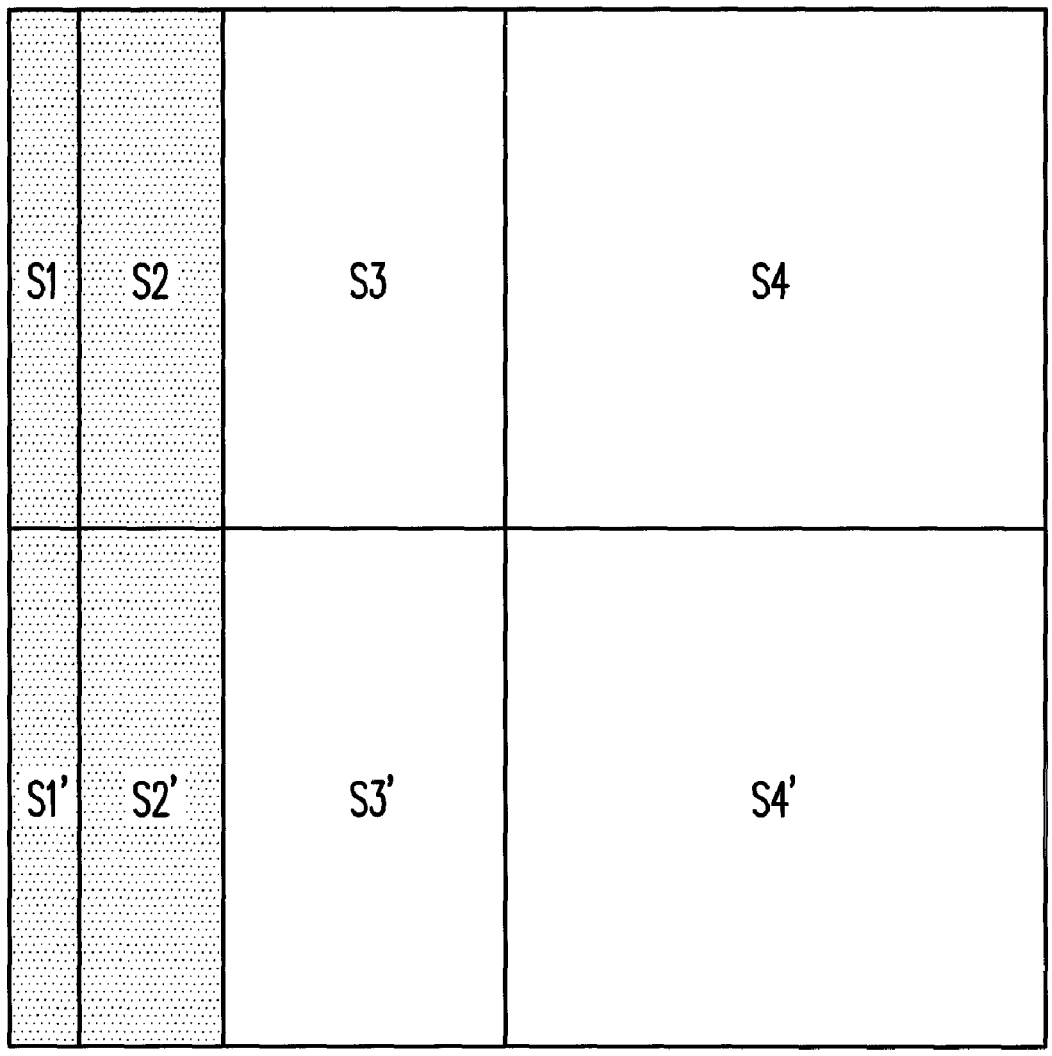
Figure 8N:
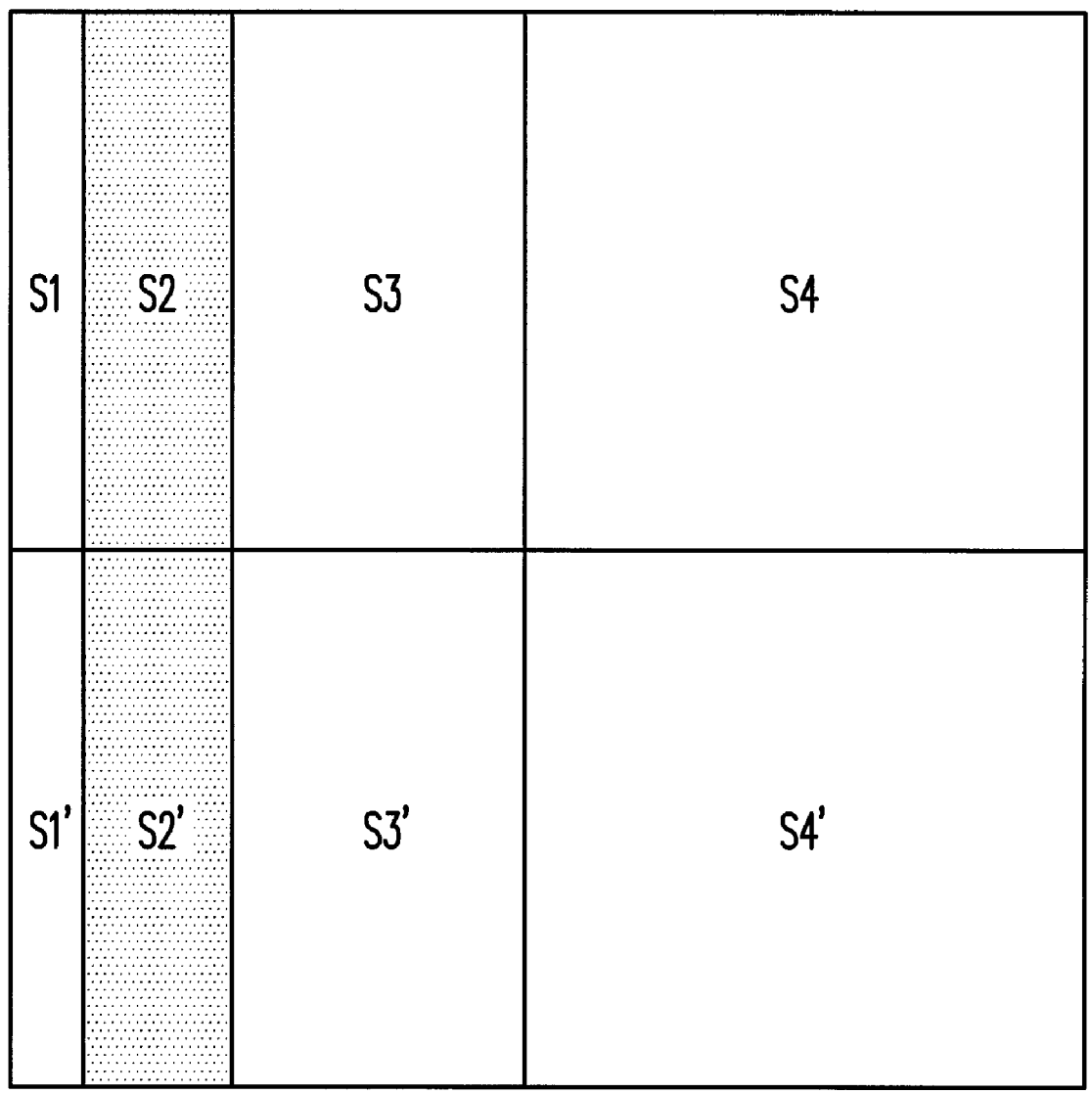
Figure 8O:
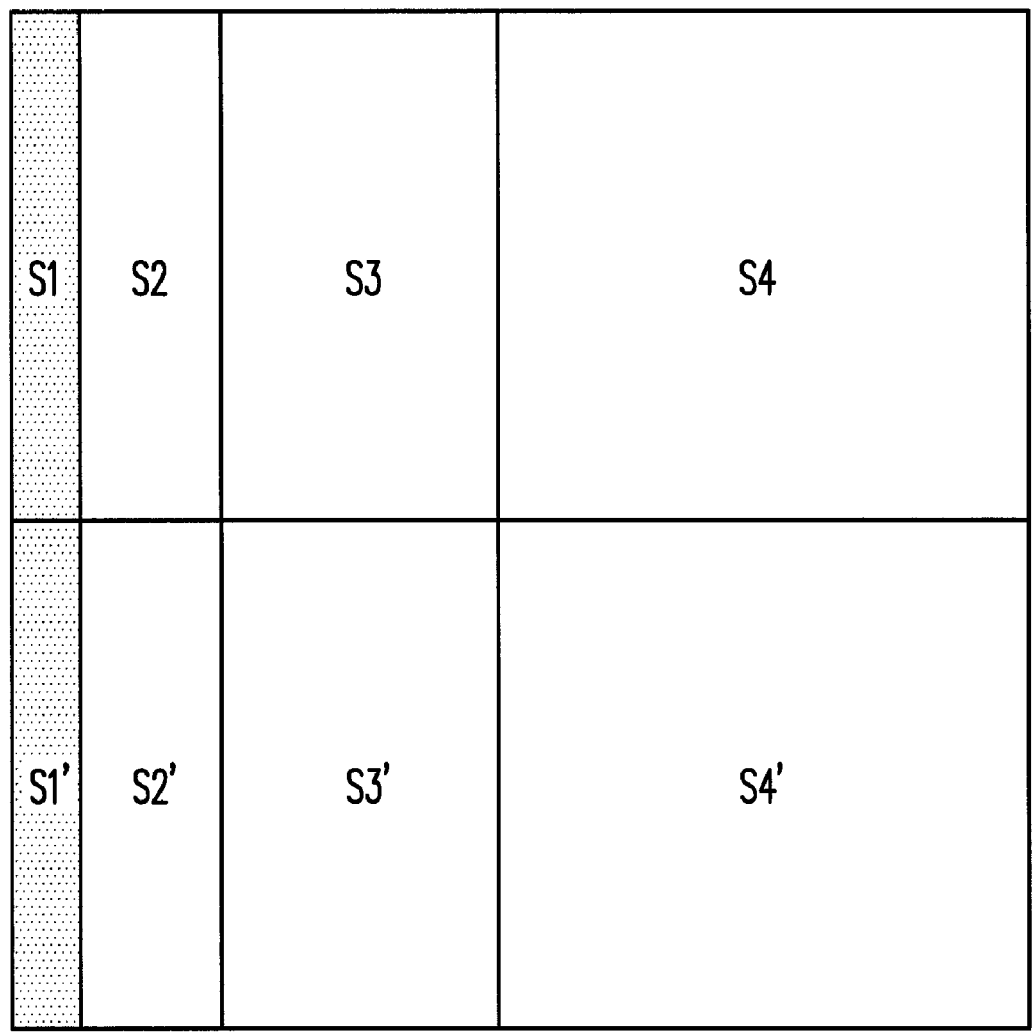
Figure 8P:
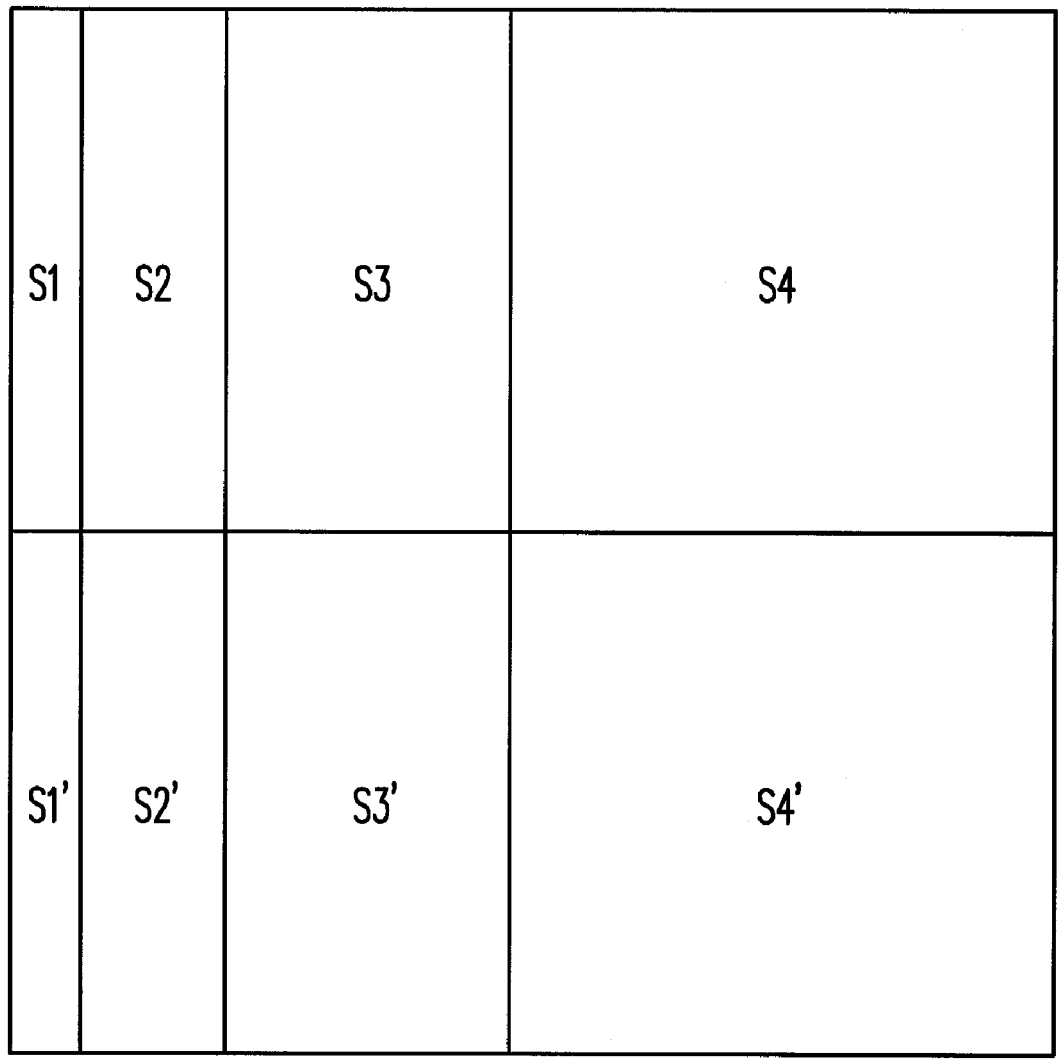

FIGS. 8A-8P are respective schematic views of the pixel structure depicted in FIG. 7 displaying gray levels 0-15. Referring to FIGS. 8A-8P, when the first sub-pixel S1, the second sub-pixel S2, the third sub-pixel S3, the fourth sub-pixel S4, the first sub-pixel S1', the second sub-pixel S2', the third sub-pixel S3', and the fourth sub-pixel S4' are all turned off to display black, the pixel structure 100d displays gray level 0 (as shown in FIG. 8A).

When the first sub-pixel S1 is turned on to display yellow, the first sub-pixel S1' is turned on to display blue, and the second sub-pixel S2, the third sub-pixel S3, the fourth sub-pixel S4, the second sub-pixel S2', the third sub-pixel S3', and the fourth sub-pixel S4' are turned off to display black, the pixel structure 100d displays gray level 1 (as shown in FIG. 8B).

When the second sub-pixel S2 is turned on to display yellow, the second sub-pixel S2' is turned on to display blue, and the first sub-pixel S1, the third sub-pixel S3, the fourth sub-pixel S4, the first sub-pixel S1', the third sub-pixel S3', and the fourth sub-pixel S4' are all off to display black, the pixel structure 100d displays gray level 2 (as shown in FIG. 8C).

When the first sub-pixel S1 and the second sub-pixel S2 are turned on to display yellow, the first sub-pixel S1' and the second sub-pixel S2' are turned on to display blue, and the third sub-pixel S3, the fourth sub-pixel S4, the third sub-pixel S3', and the fourth sub-pixel S4' are turned off to display black, the pixel structure 100d displays gray level 3 (as shown in FIG. 8D).

When the third sub-pixel S3 is turned on to display yellow, the third sub-pixel S3' is turned on to display blue, and the first sub-pixel S1, the second sub-pixel S2, the fourth sub-pixel S4, the first sub-pixel S1', the second sub-pixel S2', and the fourth sub-pixel S4' are turned off to display black, the pixel structure 100d displays gray level 4 (as shown in FIG. 8E).

When the first sub-pixel S1 and the third sub-pixel S3 are turned on to display yellow, the first sub-pixel S1' and the third sub-pixel S3' are turned on to display blue, and the second sub-pixel S2, the fourth sub-pixel S4, the second sub-pixel S2', and the fourth sub-pixel S4' are turned off to display black, the pixel structure 100d displays gray level 5 (as shown in FIG. 8F).

When the second sub-pixel S2 and the third sub-pixel S3 are turned on to display yellow, the second sub-pixel S2' and the third sub-pixel S3' are turned on to display blue, and the first sub-pixel S1, the fourth sub-pixel S4, the first sub-pixel S1', and the fourth sub-pixel S4' are turned off to display black, the pixel structure 100d displays gray level 6 (as shown in FIG. 8G).

When the first sub-pixel S1, the second sub-pixel S2, and the third sub-pixel S3 are turned on to display yellow, the first sub-pixel S1', the second sub-pixel S2', and the third sub-pixel S3' are turned on to display blue, and the fourth sub-pixel S4 and the fourth sub-pixel S4' are turned off to display black, the pixel structure 100d displays gray level 7 (as shown in FIG. 8H).

When the fourth sub-pixel S4 is turned on to display yellow, the fourth sub-pixel S4' is turned on to display blue, and the first sub-pixel S1, the second sub-pixel S2, the third sub-pixel S3, the first sub-pixel S1', the second sub-pixel S2', and the third sub-pixel S3' are turned off to display black, the pixel structure 100d displays gray level 8 (as shown in FIG. 8I).

When the first sub-pixel S1 and the fourth sub-pixel S4 are turned on to display yellow, the first sub-pixel S1' and the fourth sub-pixel S4' are turned on to display blue, and the second sub-pixel S2, the third sub-pixel S3, the second sub-pixel S2', and the third sub-pixel S3' are turned off to display black, the pixel structure 100d displays gray level 9 (as shown in FIG. 8J).

When the second sub-pixel S2 and the fourth sub-pixel S4 are turned on to display yellow, the second sub-pixel S2' and the fourth sub-pixel S4' are turned on to display blue, and the first sub-pixel S1, the third sub-pixel S3, the first sub-pixel S1', and the third sub-pixel S3' are turned off to display black, the pixel structure 100d displays gray level 10 (as shown in FIG. 8K).

When the first sub-pixel S1, the second sub-pixel S2, and the fourth sub-pixel S4 are turned on to display yellow, the first sub-pixel S1', the second sub-pixel S2', and the fourth sub-pixel S4' are turned on to display blue, and the third sub-pixel S3 and the third sub-pixel S3' are turned off to display black, the pixel structure 100d displays gray level 11 (as shown in FIG. 8L).

When the third sub-pixel S3 and the fourth sub-pixel S4 are turned on to display yellow, the third sub-pixel S3' and the fourth sub-pixel S4' are turned on to display blue, and the first sub-pixel S1, the second sub-pixel S2, the first sub-pixel S1', and the second sub-pixel S2' are turned off to display black, the pixel structure 100d displays gray level 12 (as shown in FIG. 8M).

When the first sub-pixel S1, the third sub-pixel S3, and the fourth sub-pixel S4 are turned on to display yellow, the first sub-pixel S1', the third sub-pixel S3', and the fourth sub-pixel S4' are turned on to display blue, and the second sub-pixel S2 and the second sub-pixel S2' are turned off to display black, the pixel structure 100d displays gray level 13 (as shown in FIG. 8N).

When the second sub-pixel S2, the third sub-pixel S3, and the fourth sub-pixel S4 are turned on to display yellow, the second sub-pixel S2', the third sub-pixel S3', and the fourth sub-pixel S4' are turned on to display blue, and the first sub-pixel S1 and the first sub-pixel S1' are turned off to display black, the pixel structure 100d displays gray level 14 (as shown in FIG. 8O).

When the first sub-pixel S1, the second sub-pixel S2, the third sub-pixel S3, and the fourth sub-pixel S4 are all turned on to display yellow, the first sub-pixel S1', the second sub-pixel S2', the third sub-pixel S3', and the fourth sub-pixel S4' are all turned on to display blue, the pixel structure 100d displays gray level 15 (as shown in FIG. 8P).

As shown in FIGS. 8A-8P, the pixel structure 100d formed by the first sub-pixel S1, the second sub-pixel S2, the third sub-pixel S3, the fourth sub-pixel S4, the first sub-pixel S1', the second sub-pixel S2', the third sub-pixel S3', and the fourth sub-pixel S4' may be adapted for the display of 16 gray levels (4 bits design).

By applying different electric or magnetic fields in embodiments of the invention so the electrically tunable photonic crystal layer displays different colors, and achieving gray level display through a plurality of (at least two) pairs of sub-pixels having different areas in the pixel structure, the pixel structure having the electrically tunable photonic crystal layer is thus capable of displaying different levels of white.

Although the invention has been disclosed by the above embodiments, they are not intended to limit the invention. Those skilled in the art may make some modifications and alterations without departing from the spirit and scope of the invention. Therefore, the protection range of the invention falls in the appended claims.

What is claimed is:

1. A pixel structure, comprising:
   a pair of first sub-pixels substantially identical in area;
   a pair of second sub-pixels substantially identical in area, the area of each of the second sub-pixels being twice the area of each of the first sub-pixels; and
   an electrically tunable photonic crystal layer disposed over the pair of first sub-pixels and the pair of second sub-pixels.

2. The pixel structure as claimed in claim 1, wherein the pair of first sub-pixels and the pair of second sub-pixels are arranged in a 2×2 sub-pixel array matrix.

3. The pixel structure as claimed in claim 2, wherein the pair of first sub-pixels is arranged in a same column, the pair of second sub-pixels is arranged in a same column, and the pair of first sub-pixels and the pair of second sub-pixels are arranged in different columns.

4. The pixel structure as claimed in claim 2, wherein the pair of first sub-pixels is arranged in a same row, the pair of second sub-pixels is arranged in a same row, and the pair of first sub-pixels and the pair of second sub-pixels are arranged in different rows.

5. The pixel structure as claimed in claim 2, wherein the pair of first sub-pixels is not aligned in a column direction and in a row direction, and the pair of second sub-pixels is not aligned in the column direction and in the row direction.

6. The pixel structure as claimed in claim 1, further comprising:
   a pair of third sub-pixels substantially identical in area; and
   a pair of fourth sub-pixels substantially identical in area, wherein the area of each of the third sub-pixels is twice the area of each of the second sub-pixels, the area of each of the fourth sub-pixels is twice the area of each of the third sub-pixels, and the electrically tunable photonic crystal layer is further disposed over the pair of third sub-pixels and the pair of fourth sub-pixels.

7. The pixel structure as claimed in claim 6, wherein one of the first sub-pixels displays a first color light, and another one of the first sub-pixels displays a second color light; one of the second sub-pixels displays the first color light, and another one of the second sub-pixels displays the second color light; one of the third sub-pixels displays the first color light, and another one of the third sub-pixels displays the second color light; one of the fourth sub-pixels displays the first color light, another one of the fourth sub-pixels displays the second color light, and the first color light and the second color light are complementary colors.

8. The pixel structure as claimed in claim 1, wherein one of the first sub-pixels displays a first color light, and another one of the first sub-pixels displays a second color light; one of the second sub-pixels displays the first color light, another one of the second sub-pixels displays the second color light, and the first color light and the second color light are complementary colors.

* * * * *